United States Patent
Takamura et al.

(10) Patent No.: US 11,900,809 B2
(45) Date of Patent: Feb. 13, 2024

(54) VEHICLE NOTIFICATION SOUND GENERATION SYSTEM

(71) Applicant: Toyota Jidosha Kabushiki Kaisha, Toyota (JP)

(72) Inventors: Tohru Takamura, Toyota (JP); Jun Kokaji, Nagoya (JP); Masahiro Mori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 434 days.

(21) Appl. No.: 16/904,016

(22) Filed: Jun. 17, 2020

(65) Prior Publication Data

US 2020/0402401 A1 Dec. 24, 2020

(30) Foreign Application Priority Data

Jun. 20, 2019 (JP) ................. 2019-114278

(51) Int. Cl.
  *G08G 1/133* (2006.01)
  *B60W 60/00* (2020.01)
  *B60R 11/02* (2006.01)
  *B60W 40/08* (2012.01)

(52) U.S. Cl.
  CPC .......... *G08G 1/133* (2013.01); *B60R 11/0217* (2013.01); *B60W 40/08* (2013.01); *B60W 60/00* (2020.02); *B60W 2300/10* (2013.01)

(58) Field of Classification Search
  None
  See application file for complete search history.

(56) References Cited

U.S. PATENT DOCUMENTS

| | | | |
|---|---|---|---|
| 2012/0299718 A1 | 11/2012 | Yoshino et al. | |
| 2013/0322665 A1* | 12/2013 | Bennett | G01C 21/3664 |
| | | | 381/300 |
| 2017/0212720 A1 | 7/2017 | Moriguchi et al. | |
| 2017/0245069 A1* | 8/2017 | Moriguchi | H04R 3/04 |
| 2018/0098164 A1 | 4/2018 | Moriguchi et al. | |
| 2019/0023282 A1* | 1/2019 | Kuroda | B60Q 5/006 |
| 2021/0403051 A1* | 12/2021 | Jaegal | B60W 40/02 |

FOREIGN PATENT DOCUMENTS

| | | | | |
|---|---|---|---|---|
| CN | 106797257 A | 5/2017 | | |
| CN | 108885830 A | 11/2018 | | |
| JP | 07-272199 A | 10/1995 | | |
| JP | 2016-062414 A | 4/2016 | | |
| JP | 2018-112850 A | 7/2018 | | |
| WO | 2017/168602 A1 | 10/2017 | | |
| WO | WO-2017168602 A1 * | 10/2017 | ............. | B60K 35/00 |

* cited by examiner

*Primary Examiner* — Thomas E Worden
(74) *Attorney, Agent, or Firm* — Dinsmore & Shohl LLP

(57) ABSTRACT

There is provided a vehicle notification sound generation system mounted on a self-driving capable electric bus, and the system has a speaker that outputs a verbal speech about arrival of the electric bus at a destination and outputs a non-verbal sound corresponding to a state of acceleration/deceleration of the electric bus before acceleration/deceleration operation or during acceleration/deceleration of the electric bus.

7 Claims, 15 Drawing Sheets

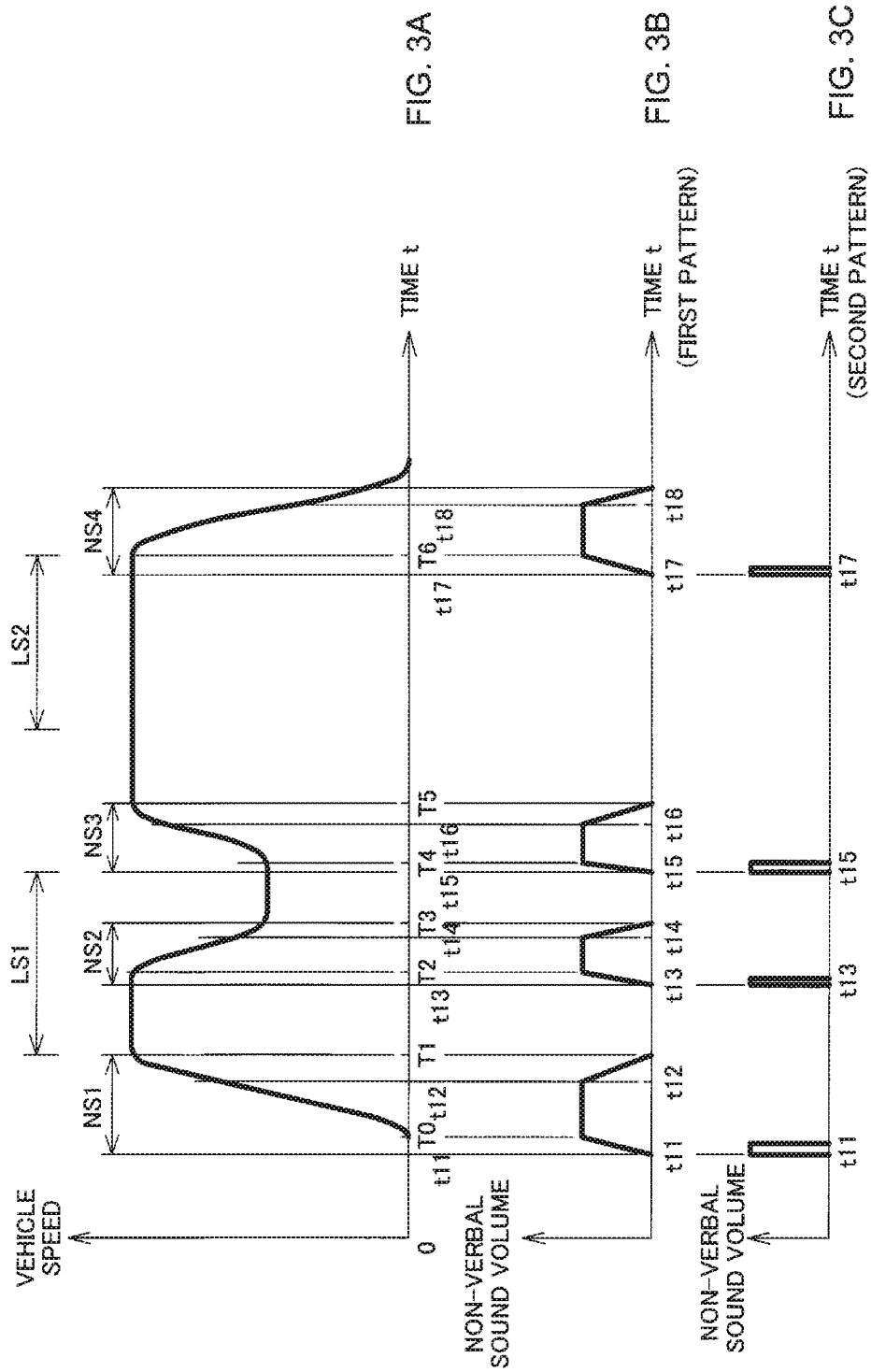

(THIRD PATTERN)

(FOURTH PATTERN)

(FIFTH PATTERN)

(SIXTH PATTERN)

VEHICLE NOTIFICATION SOUND GENERATION SYSTEM

CROSS REFERENCE TO RELATED APPLICATION

This application claims priority to Japanese Patent Application No. 2019-114278 filed on Jun. 20, 2019, which is incorporated herein by reference in its entirety including the specification, claims, drawings, and abstract.

TECHNICAL FIELD

The present disclosure relates to a vehicle notification sound generation system, and in particular to a vehicle notification sound generation system mounted on a self-driving capable bus-type vehicle.

BACKGROUND

There has been proposed a technique of predicting, in a self-driving vehicle, jolting of the vehicle based on prior information for automatic driving before an automatic driving controller performs control, and notifying passengers of information about the predicted vehicle behavior in voice from a speaker (see, for example, JP 2018-112850 A).

SUMMARY

In recent years, introduction of vehicles such as self-driving capable buses has been planned. In such a bus-type vehicle, announcements or the like are made when arriving at a bus stop. If information about vehicle behavior like that disclosed in JP 2018-112850 A is also announced in voice, passengers may not be able to distinguish or recognize the two voices and may not be guided appropriately.

Accordingly, an object of the present disclosure is to appropriately guide passengers in a self-driving capable bus-type vehicle.

A vehicle notification sound generation system according to the present disclosure is a vehicle notification sound generation system mounted on a self-driving capable bus-type vehicle, and the system has a vehicle interior speaker that outputs a verbal speech about arrival of the vehicle at a destination and a non-verbal sound corresponding to a state of acceleration/deceleration or a state of turning of the vehicle before acceleration/deceleration operation, during acceleration/deceleration, before the start of turning, or during turning of the vehicle.

The verbal speech about the arrival at the destination and the non-verbal sound that differs from the verbal speech in temporal change in frequency/volume are combined, and the result is output from the speaker. Therefore, even when the verbal speech and the non-verbal sound are output simultaneously, passengers can distinguish and recognize the two sounds. Accordingly, the passengers can be guided appropriately. In addition, the verbal speech and the non-verbal sound are output from the common speaker, and therefore, cost reduction can be achieved.

In the vehicle notification sound generation system according to the present disclosure, the speaker may be mounted in the vicinity of a signage in the vehicle chamber.

The non-verbal sound is output from the speaker that outputs verbal speeches about destinations of the vehicle, etc., and therefore, cost can be reduced.

The vehicle notification sound generation system according to the present disclosure may have a verbal speech control unit that generates a verbal speech signal about the arrival of the vehicle at the destination based on travel information of the vehicle input from an automatic driving device of the vehicle, a non-verbal sound control unit that generates a non-verbal sound signal corresponding to the state of acceleration/deceleration or the state of turning of the vehicle based on behavior information of the vehicle input from the automatic driving device of the vehicle, and an amplifier that generates a notification sound signal by synthesizing the verbal speech signal input from the verbal speech control unit and the non-verbal sound signal input from the non-verbal sound control unit, and drives the speaker based on the generated notification sound signal.

As such, the verbal speech signal and the non-verbal sound signal are generated based on the inputs from the automatic driving device of the vehicle, and the two generated signals are synthesized to generate a notification sound signal. Therefore, the notification sound signal can be finely adjusted according to the state of travel of the vehicle and the vehicle behavior. This enables more appropriate guidance of the passengers.

In the vehicle notification sound generation system according to the present disclosure, the non-verbal sound control unit may change, a predetermined time before the end of acceleration or the end of turning, the waveform of the non-verbal sound signal obtained during acceleration.

Accordingly, it is possible to notify the passengers of changes in acceleration caused by acceleration or turning in advance and enable them to prepare for the force to be applied when the acceleration changes.

The vehicle notification sound generation system according to the present disclosure has a passenger detection device that detects a standing passenger or a wheelchair passenger in the vehicle chamber, and when the passenger detection device detects no standing passenger or wheelchair passenger, the non-verbal sound control unit may prohibit output of the non-verbal sound signal or reduce the output gain of the non-verbal sound signal, and when the passenger detection device detects no standing passenger or wheelchair passenger, the amplifier may prohibit synthesizing the non-verbal sound signal input from the non-verbal sound control unit with the verbal speech signal, or reduce the gain of the non-verbal sound signal to thereby synthesize the non-verbal sound signal with the verbal speech signal.

Thus, it is possible to prevent discomfort to sitting passengers when there is no standing passenger or wheelchair passenger.

The vehicle notification sound generation system according to the present disclosure may have a storage unit that stores a composite notification sound signal that is obtained by synthesizing a verbal speech signal about the arrival of the vehicle at the destination and a non-verbal sound signal corresponding to a state of acceleration/deceleration or a state of turning of the vehicle according to the verbal speech signal, and a composite notification sound control unit that outputs the composite notification sound signal stored in the storage unit based on an output command from the automatic driving device of the vehicle.

As such, the composite notification sound signal generated in advance is stored in the storage unit, and the composite notification sound is output according to a command from the automatic driving device. Accordingly, a verbal speech and a non-verbal sound can be output even without a device for synthesizing a verbal speech signal and a non-verbal sound signal. It is thus possible to guide the passengers appropriately with a simple structure.

In the vehicle notification sound generation system according to the present disclosure, the storage unit may store the composite notification sound signal and start timing data for the non-verbal sound signal included in the composite notification sound signal, and the automatic driving device of the vehicle may obtain, from the storage unit, the start timing data for the non-verbal sound signal included in the composite notification sound signal, and output, based on the start timing data, a command to output the composite notification sound signal to the composite notification sound control unit.

Therefore, it is possible to output a non-verbal sound according to the vehicle behavior.

In the vehicle notification sound generation system according to the present disclosure, the automatic driving device of the vehicle may output, to the composite notification sound control unit, a command to output the composite notification sound signal such that the non-verbal sound signal is started a predetermined time before the start of acceleration/deceleration or the start of turning.

This allows the non-verbal sound to be output before the acceleration/deceleration operation or the turning operation starts, to thereby enable the passengers to prepare for the force to be applied during the acceleration/deceleration operation or the turning operation.

The vehicle notification sound generation system according to the present disclosure may have a level adjustment unit that adjusts the gain of an approach notification sound signal output from an approach notification sound generation system mounted on the vehicle according to behavior information of the vehicle input from the automatic driving device of the vehicle, and outputs the resulting signal as a non-verbal sound signal, and a mixing unit that generates a notification sound signal by synthesizing a verbal speech signal about the arrival of the vehicle at the destination input from a signage system and the non-verbal sound signal input from the level adjustment unit, the signage system generating the verbal speech signal based on travel information of the vehicle input from the automatic driving device of the vehicle.

As such, the notification sound signal is generated by synthesizing the approach notification sound signal output from the approach notification sound generation system mounted on the vehicle and the verbal speech signal output from the signage system. Accordingly, there is no need for devices that generate a verbal speech signal and a non-verbal sound signal. It is thus possible to guide the passengers appropriately with a simple structure.

The vehicle notification sound generation system according to the present disclosure has a first speaker that outputs a verbal speech about arrival of the vehicle at a destination, a volume adjustment unit that adjusts the gain of an approach notification sound signal according to behavior information of the vehicle input from the automatic driving device of the vehicle, to thereby generate a non-verbal sound signal corresponding to a state of acceleration/deceleration or a state of turning of the vehicle before acceleration/deceleration operation, during acceleration/deceleration, before the start of turning, or during turning of the vehicle, the approach notification sound signal being output from an approach notification sound generation system mounted on the vehicle, and a second speaker that outputs a non-verbal sound based on the non-verbal sound signal generated by the volume adjustment unit.

The non-verbal sound signal is generated by adjusting the gain of the approach notification sound signal output from the approach notification sound generation system mounted on the vehicle. Therefore, there is no need for a device that generates a non-verbal sound signal, and it is thus possible to guide the passengers appropriately with a simple structure.

The vehicle notification sound generation system according to the present disclosure is a vehicle notification sound generation system mounted on a self-driving capable bus-type vehicle, and the system has a first speaker that outputs, into a vehicle chamber, a verbal speech about arrival of the vehicle at a destination; a third speaker that outputs, to the outside of the vehicle, an approach notification sound output from an approach notification sound generation system mounted on the vehicle, and has a duct connected thereto, the duct communicating with the vehicle chamber, an acoustic shutter that is provided in the duct for opening and closing an opening of the duct on the interior side of the vehicle chamber, and a shutter control unit that controls the degree of opening of the acoustic shutter according to behavior information of the vehicle input from an automatic driving device of the vehicle.

The third speaker, which outputs the approach notification sound, is used to output a non-verbal sound, and it is thus possible to guide the passengers appropriately with a simple structure.

According to the present disclosure, it is possible to guide passengers appropriately in a self-driving capable bus-type vehicle.

BRIEF DESCRIPTION OF DRAWINGS

Embodiments of the present disclosure will be described based on the following figures, wherein:

FIG. 3A is a graph showing changes in vehicle speed of a vehicle and the timing of generation of verbal speeches and non-verbal sounds in the vehicle notification sound generation system shown in FIG. 2;

FIG. 3B is a diagram showing changes in volume of the non-verbal sounds in the vehicle notification sound generation system shown in FIG. 2;

FIG. 3C is a diagram showing changes in volume of the non-verbal sounds in the vehicle notification sound generation system shown in FIG. 2;

DESCRIPTION OF EMBODIMENTS

Hereinafter, a vehicle notification sound generation system 100 according to an embodiment will be described with reference to the drawings. First, an electric bus 10 on which the vehicle notification sound generation system 100 according to the present embodiment is mounted will be described with reference to FIG. 1.

Figure 1:
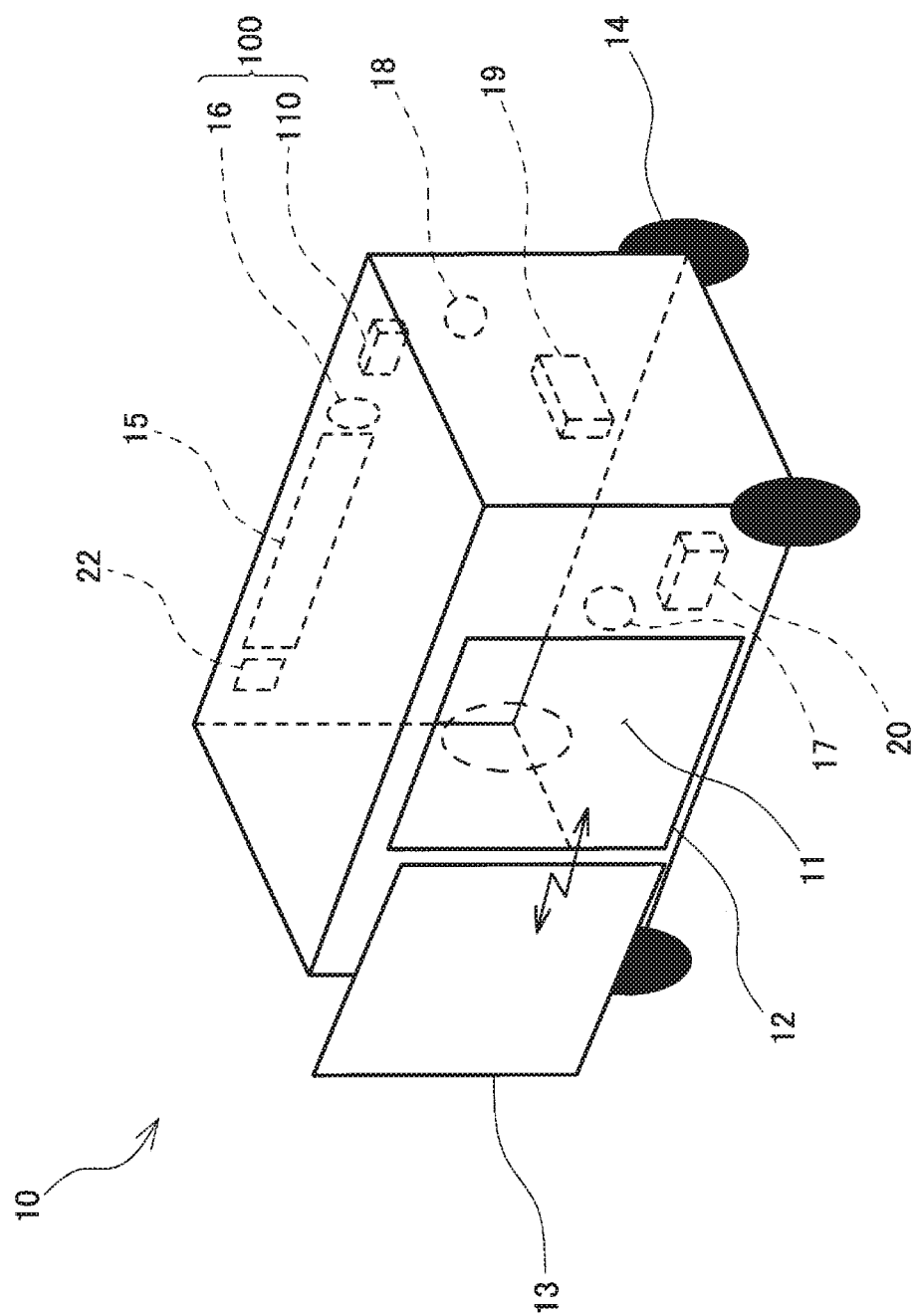
FIG. 1 is a perspective view showing a vehicle on which a vehicle notification sound generation system according to an embodiment is mounted.

As shown in FIG. 1, the electric bus 10 is a self-driving capable bus-type electric vehicle and is composed of a body 12 constituting a vehicle chamber 11, an entrance door 13 provided on the side of the body 12, and wheels 14 driven by a motor (not shown). The vehicle chamber 11 has an automatic driving device 19, an approach notification sound generation system 20, a passenger detection device 18, signage 15, and a signage system 22 mounted therein. A speaker 16 and a notification sound generation unit 110 are mounted in the vicinity of the signage 15. In addition, a vehicle exterior speaker 17 is mounted in the vicinity of the door 13.

The automatic driving device 19 is a device for controlling the motor and the like of the electric bus 10 to thereby perform automatic driving. The approach notification sound generation system 20 generates an approach notification sound from the vehicle exterior speaker 17 while the electric bus 10 is running. The signage system 22 causes the signage 15 to display destinations of the electric bus 10, etc. The passenger detection device 18 detects if there is a standing passenger or a wheelchair passenger in the vehicle chamber 11. The notification sound generation unit 110 outputs, through the speaker 16, a verbal speech about the arrival of the electric bus 10 at a destination and a non-verbal sound corresponding to the state of acceleration/deceleration of the electric bus 10 before acceleration/deceleration operation or during acceleration/deceleration of the electric bus 10.

Figure 2:
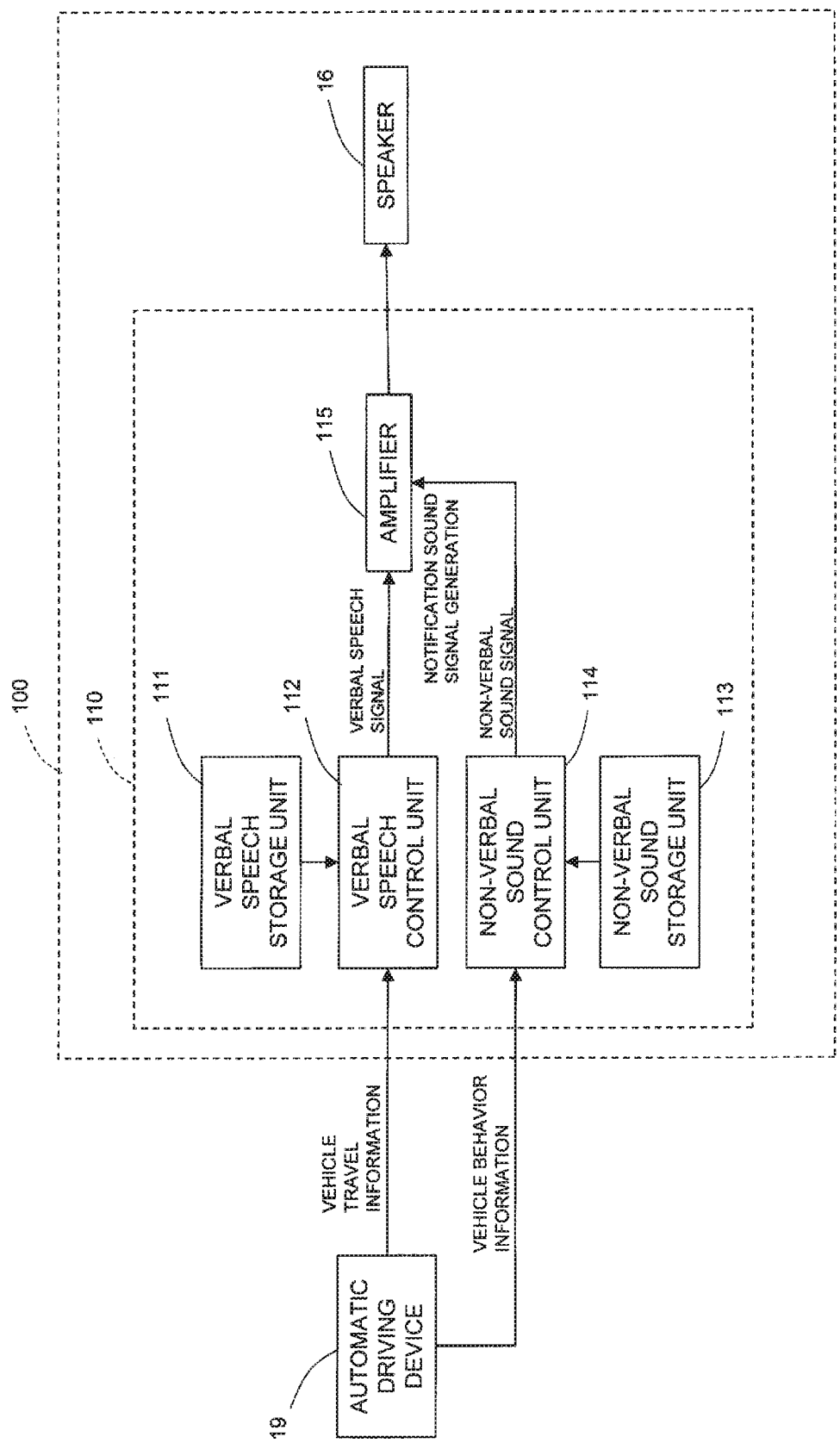
FIG. 2 is a functional block diagram of the vehicle notification sound generation system according to the embodiment.

Next, the vehicle notification sound generation system 100 will be described with reference to FIG. 2. As shown in FIG. 2, the vehicle notification sound generation system 100 is composed of the notification sound generation unit 110 and the speaker 16. The notification sound generation unit 110 is composed of a computer having a CPU and a memory therein and includes functional blocks of a verbal speech storage unit 111, a verbal speech control unit 112, a non-verbal sound storage unit 113, a non-verbal sound control unit 114, and an amplifier 115.

The verbal speech storage unit 111 stores verbal speech data about the arrival of the electric bus 10 at a destination. The verbal speech data includes verbal speech data or the like to output announcements, such as, for example, "the next stop is XX. If you wish to get off the bus, . . . " and "the bus will be arriving at XX shortly". The verbal speech control unit 112 reads out the verbal speech data from the verbal speech storage unit 111 based on vehicle travel information input from the automatic driving device 19 of the electric bus 10, and outputs a verbal speech signal to the amplifier 115. Here, the vehicle travel information includes, for example, information about a current position of the electric bus 10, and information about a location of a bus stop or information about the distance to the bus stop.

The non-verbal sound storage unit 113 stores non-verbal sound data for alerting passengers according to vehicle behavior, such as acceleration or deceleration. A non-verbal sound is a sound that differs from a verbal sound in temporal change in frequency/volume, and, for example, it may be a sound, such as "pip" or "bleep", that can be changed in volume or frequency or in both volume and frequency to cause the passengers to imagine the behavior of the electric bus 10, such as acceleration or deceleration. For example, the non-verbal sound is a sound that gradually increases in volume or frequency before the start of acceleration and gradually declines in volume or frequency in the case of deceleration. The non-verbal sound may also be a chime sound.

The non-verbal sound control unit 114 reads out the non-verbal sound data from the non-verbal sound storage unit 113 based on vehicle behavior information input from the automatic driving device 19 of the electric bus 10, and outputs a non-verbal sound signal to the amplifier 115. Here, the vehicle behavior information includes a command signal that is output when the automatic driving device 19 causes the electric bus 10 to perform the behavior, such as acceleration or deceleration. Upon receipt of the command signal from the automatic driving device 19 as an input, a driving device of the electric bus 10 adjusts the rotation speed of the motor to perform the behavior, such as acceleration or deceleration. Accordingly, the command signal for the vehicle behavior is output from the automatic driving device 19 shortly before the electric bus 10 starts the behavior, such as acceleration or deceleration. The vehicle behavior information also includes a command advance notice signal for the command signal described above. The automatic driving device 19 outputs the command advance notice signal and then outputs the command signal to cause the electric bus 10 to accelerate or decelerate.

The amplifier 115 generates a notification sound signal by synthesizing the verbal speech signal input from the verbal speech control unit 112 and the non-verbal sound signal input from the non-verbal sound control unit 114, and drives the speaker 16 located in the vehicle chamber 11 based on the generated notification sound signal.

Next, running of the electric bus 10 and output examples of verbal speeches and non-verbal sounds will be described with reference to FIGS. 3A to 3C. Here, FIG. 3B is a diagram showing a first pattern of change in volume of a non-verbal sound, and FIG. 3C is a diagram showing a second pattern of change in volume of a non-verbal sound.

As shown in FIG. 3A, the automatic driving device 19 outputs, at time t11, a command signal to start running and accelerate. Due to this command signal, the electric bus 10 starts running at time T0 which is slightly later than time t11 and accelerates until time T1. The automatic driving device 19 then outputs a command advance notice signal to end acceleration at time t12 which is shortly before time T1 when acceleration ends, and subsequently outputs a signal to reduce acceleration. As a result, the electric bus 10 gradually reduces acceleration and is shifted to constant speed running at time T1.

Upon receipt of the acceleration command signal as an input from the automatic driving device 19 at time t11, the non-verbal sound control unit 114 of the vehicle notification sound generation system 100 increases the gain of a non-verbal sound signal so as to gradually increase the volume of a non-verbal sound, as shown in FIG. 3B. Then, the non-verbal sound control unit 114 keeps the gain of the non-verbal sound signal constant so as to keep the volume of the non-verbal sound constant during acceleration. Upon receipt of the command advance notice signal to reduce acceleration as an input at time t12, the non-verbal sound control unit 114 reduces the gain of the non-verbal sound signal so as to gradually reduce the volume of the non-verbal sound. This non-verbal sound signal is input to the amplifier 115 and then synthesized with a verbal speech signal. During a period between time t11 and time t12, no announcement is made, and no verbal speech signal is output from the verbal speech control unit 112. Therefore, the amplifier 115 generates the non-verbal sound through the speaker 16 based on the non-verbal sound signal input from the non-verbal sound control unit 114. As such, as shown in FIGS. 3A and 3B, the vehicle notification sound generation system 100 outputs the non-verbal sound whose volume is changed in a trapezoidal shape during a period NS1 which starts from time t11 before the start of acceleration by the electric bus 10 and continues while the electric bus 10 accelerates.

When the electric bus 10 starts running, the verbal speech control unit 112 of the vehicle notification sound generation system 100 calculates the time required to arrive at the next bus stop based on information about a current position of the electric bus 10 and information about a location of the next bus stop input from the automatic driving device 19. If the required time is shorter than a predetermined period of time, then, on-board announcements, such as, for example, "the next stop is XX. If you wish to get off the bus, . . . " are made. In this case, the verbal speech control unit 112 reads out verbal speech data corresponding to the above announcements from the verbal speech storage unit 111 and outputs the data to the amplifier 115 as a verbal speech signal. The verbal speech control unit 112 may also output the verbal speech signal to the amplifier 115 in a manner similar to that described above when the distance to the next bus stop input from the automatic driving device 19 becomes shorter than a predetermined distance.

Also, upon receipt of a deceleration command signal as an input from the automatic driving device 19 at time t13, the non-verbal sound control unit 114 of the vehicle notification sound generation system 100 increases the gain of the non-verbal sound signal so as to gradually increase the volume of the non-verbal sound as shown in FIG. 3B. Then, the non-verbal sound control unit 114 keeps the gain of the non-verbal sound signal constant so as to keep the volume of the non-verbal sound constant during deceleration. Upon receipt of a command advance notice signal to reduce deceleration as an input at time t14, the non-verbal sound control unit 114 reduces the gain of the non-verbal sound signal so as to gradually reduce the volume of the non-verbal sound. The non-verbal sound signal output from the non-verbal sound control unit 114 is input to the amplifier 115.

The amplifier 115 generates a notification sound signal by synthesizing the verbal speech signal input from the verbal speech control unit 112 and the non-verbal sound signal input from the non-verbal sound control unit 114, and drives the speaker 16 based on the generated notification sound signal. The speaker 16 of the vehicle notification sound generation system 100 thus outputs on-board announcements, such as, for example, "the next stop is XX. If you wish to get off the bus, . . . " during a period LS1 shown in FIG. 3A. In addition, as shown in FIG. 3A and FIG. 3B, during a period NS2 in the period LS1, a non-verbal sound, such as "bleep", whose volume changes in a trapezoidal shape is output so as to overlap with the announcements.

Similarly, the vehicle notification sound generation system 100 outputs the non-verbal sound during periods NS3 and NS4 shown in FIG. 3A, and outputs, during a period LS2 which is immediately before the electric bus 10 arrives at the bus stop, announcements, such as, for example, "the bus will be arriving at XX shortly".

The vehicle notification sound generation system 100 may also generate short discontinuous one-shot sounds as in a second pattern shown in FIG. 3C, in place of the continuous non-verbal sound shown in FIG. 3B. In this case, the non-verbal sound control unit 114 outputs non-verbal sound signals that generate a short non-verbal sound, such as "pip", at times t11, t13, t15, and t17 at which command signals for acceleration or command advance notice signals for deceleration are input from the automatic driving device 19. If on-board announcements are being made during the periods LS1 and LS2, the non-verbal sound, such as "pip", is output so as to overlap with them during the announcements.

Next, running of the electric bus 10 and other output examples of non-verbal sounds of the electric bus 10 will be described with reference to FIGS. 4A to 4G. Here, FIGS. 4D to 4G are diagrams showing third to sixth patterns of change in volume of non-verbal sounds. In the third to sixth patterns, the previous volume or frequency of the non-verbal sound is changed before the acceleration changes toward the end of the acceleration.

Figure 4A:
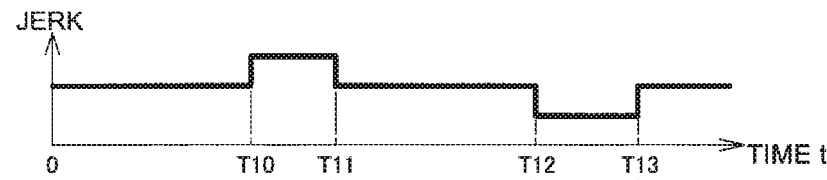
FIG. 4A is a diagram showing changes in jerk of the vehicle in the vehicle notification sound generation system shown in FIG. 2.
Figure 4B:
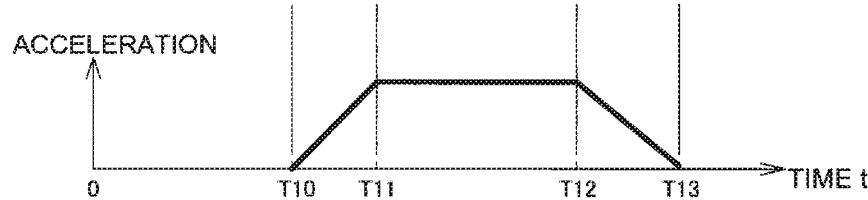
FIG. 4B is a diagram showing changes in acceleration in the vehicle notification sound generation system shown in FIG. 2.
Figure 4C:
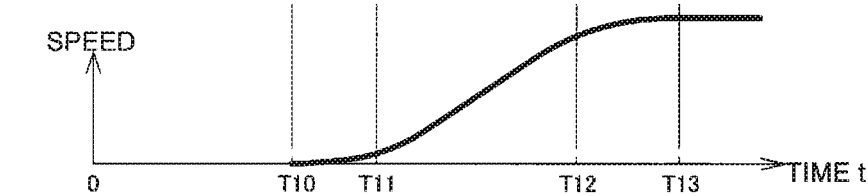
FIG. 4C is a diagram showing changes in vehicle speed in the vehicle notification sound generation system shown in FIG. 2.

As shown in FIGS. 4A to 4C, the electric bus 10 starts running at time T10, increases the acceleration between time T10 and time T11, increases the speed at constant acceleration between time T11 and time T12, reduces the acceleration between time T12 and time T13, and runs at a constant speed after time T13. Jerk has a constant positive value between times T10 and T11 where the acceleration is increased and a constant negative value between times T12 and T13 where the acceleration is reduced. During a period between times T11 to T12 where the acceleration is constant, the jerk is zero.

Figure 4D:
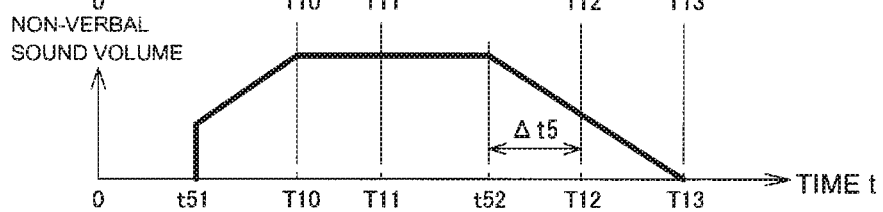
FIG. 4D is a graph showing the timing of generation of a non-verbal sound and changes in volume of the non-verbal sound in the vehicle notification sound generation system shown in FIG. 2.

The third pattern will be described with reference to FIG. 4D. The automatic driving device 19 outputs, at time t51, a command advance notice signal to start running and accelerate. Due to this command advance notice signal, the electric bus 10 starts running at time T10 which is after time t51. Upon receipt of the command advance notice signal to accelerate as an input from the automatic driving device 19, the non-verbal sound control unit 114 increases the gain of a non-verbal sound signal so as to increase the volume of a non-verbal sound to a predetermined volume, as shown in FIG. 4D. Then, the non-verbal sound control unit 114 keeps the gain of the non-verbal sound signal constant so as to keep the volume of the non-verbal sound constant after time T10 at which the electric bus 10 starts running.

The automatic driving device 19 outputs a command advance notice signal to start reduction of the acceleration at time t52 which is earlier than time T12 at which the electric bus 10 starts reduction of the acceleration, by a predetermined period Δt5. Upon receipt of the command advance notice signal as an input from the automatic driving device 19 at time t52, the non-verbal sound control unit 114 reduces the gain of the non-verbal sound signal so as to fade out the non-verbal sound, as shown in FIG. 4D.

Figure 4E:
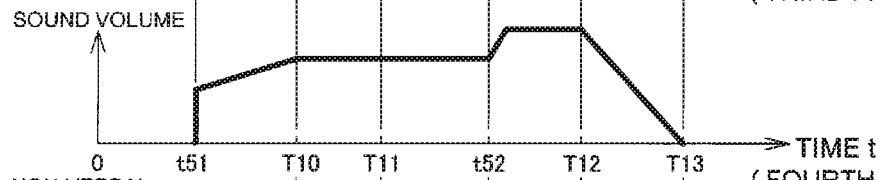
FIG. 4E is a graph showing the timing of generation of a non-verbal sound and changes in volume of the non-verbal sound in the vehicle notification sound generation system shown in FIG. 2.

In the fourth pattern shown in FIG. 4E, upon receipt of a command advance notice signal as an input from the automatic driving device 19 at time t52, the non-verbal sound control unit 114 increases the gain of a non-verbal sound signal so as to increase the volume of a non-verbal sound after time t52. The non-verbal sound control unit 114 then keeps the gain of the non-verbal sound signal constant so as to maintain the high volume until a command signal to start reduction of the acceleration is input from the automatic driving device 19 at T12. The non-verbal sound control unit 114 then reduces the gain of the non-verbal sound signal so as to fade out the non-verbal sound after time T12.

Figure 4F:
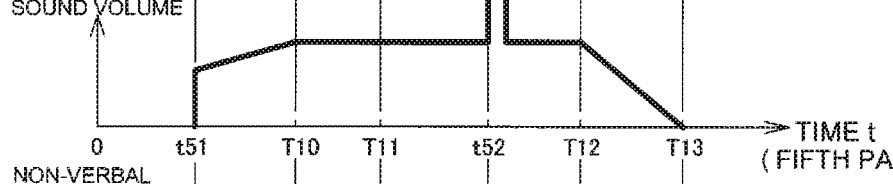
FIG. 4F is a graph showing the timing of generation of a non-verbal sound and changes in volume of the non-verbal sound in the vehicle notification sound generation system shown in FIG. 2.

In the fifth pattern shown in FIG. 4F, the non-verbal sound control unit 114 outputs, between times t51 and T13, a signal for a non-verbal sound, such as "bleep", and outputs, at time t52, a signal to output a non-verbal sound, such as a chime sound "ding-dong", that has a different tone from the previous non-verbal sound. Then, the non-verbal sound control unit 114 reduces the gain of the non-verbal sound signal so as to fade out the non-verbal sound after time T12.

Figure 4G:
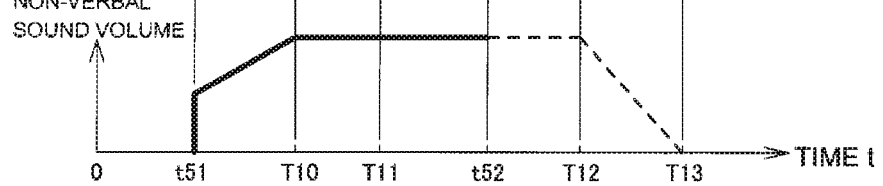
FIG. 4G is a graph showing the timing of generation of a non-verbal sound and changes in volume of the non-verbal sound in the vehicle notification sound generation system shown in FIG. 2.

In the sixth pattern shown in FIG. 4G, the non-verbal sound control unit 114 changes the frequency of a non-verbal sound signal that continues until time t52 to thereby obtain the frequency of the non-verbal sound signal between time t52 and time T13 indicated by a broken line in FIG. 4G. The non-verbal sound control unit 114 also reduces the gain of the non-verbal sound signal to fade out the non-verbal sound after time T12.

In the third pattern to the sixth pattern described above, the gain/frequency of the non-verbal sound signal is changed a predetermined time Δt5 before time T12 at which the jerk increases negatively at the end of acceleration, to thereby change the waveform of the non-verbal sound signal and change the previous volume or tone of the non-verbal sound.

The vehicle notification sound generation system 100 according to the embodiment described above combines the verbal speech, such as announcements about the arrival at a destination, and the non-verbal sound corresponding to the state of acceleration/deceleration of the electric bus 10, and outputs the result from the speaker 16. The non-verbal sound is a different sound from the verbal sound in terms of temporal change in frequency/volume, and therefore, even when the announcements and the non-verbal sound are output simultaneously, the passengers can distinguish and recognize the two sounds and can be guided appropriately.

In addition, the non-verbal sound is generated when a command signal or a command advance notice signal to accelerate or decelerate the electric bus 10 is input from the automatic driving device 19, and therefore, the non-verbal sound can be generated prior to actual acceleration/deceleration operation of the electric bus 10 to notify the passengers of acceleration or deceleration in advance. This enables the passengers to prepare for the behavior of the electric bus 10. It is thus possible for the passengers to prevent feeling unsteady or losing their balance when the electric bus 10 accelerates or decelerates. Further, the vehicle notification sound generation system 100 notifies the passengers of changes in acceleration in advance to thereby enable them to prepare for the force applied when the acceleration changes. It is thus possible for the passengers to avoid feeling unsteady or losing their balance.

In addition, in the vehicle notification sound generation system 100, the verbal speech, such as announcements, and the non-verbal sound are output from the common speaker 16, and therefore, cost reduction can be achieved.

Although it has been described above that the automatic driving device 19 outputs the command advance notice signal before outputting the command signal for acceleration, deceleration, or the like, and that the non-verbal sound control unit 114 generates the non-verbal sound signal based on the command advance notice signal, this is not limiting. The acceleration/deceleration operation of the electric bus 10 is later than the output of the command signal for acceleration, deceleration, or the like by the automatic driving device 19, and thus, the non-verbal sound control unit 114 can perform the same operation based on the command signal for acceleration, deceleration, or the like input from the automatic driving device 19 even when the automatic driving device 19 does not output the command advance notice signal. The non-verbal sound control unit 114 may also obtain data, such as the speed, acceleration, and jerk, as behavior information of the electric bus 10 from the automatic driving device 19. For example, when the speed becomes closer to an intended speed during acceleration, the non-verbal sound control unit 114 may predict a change in acceleration and change the previous gain or frequency of the non-verbal sound signal.

In addition, although it has been described above that the non-verbal sound control unit 114 generates the non-verbal sound signal based on the command signal/command advance notice signal for acceleration/deceleration input from the automatic driving device 19, this is not limiting. The automatic driving device 19 may generate a non-verbal sound based on a command signal or a command advance notice signal to turn the electric bus 10 and output the non-verbal sound corresponding to the state of turning of the electric bus 10 before the start of turning or during turning of the electric bus 10, together with a verbal speech about the arrival of the electric bus 10 at a destination. Like the non-verbal sound that is output during acceleration/deceleration, this non-verbal sound is a different sound from the verbal sound in terms of temporal change in frequency/volume. For example, it may be a sound, such as "pip" or "bleep", that can be changed in volume or frequency or in both volume and frequency to cause the passengers to imagine the turning behavior of the electric bus 10. For example, the non-verbal sound is a sound that gradually increases in volume or frequency before the start of turning and gradually declines in volume or frequency when the turning ends. The non-verbal sound may also be a chime sound.

The verbal speech, such as announcements about the arrival at a destination, and the non-verbal sound corresponding to the state of turning of the electric bus 10 are combined in this manner, and the result is output from the speaker 16. Therefore, even when the announcements and the non-verbal sound are output simultaneously, the passengers can distinguish and recognize the two sounds and can be guided appropriately.

An additional non-verbal sound may be generated prior to actual turning operation of the electric bus 10 to notify the passengers of the start of turning or the end of the turning in advance. This enables the passengers to prepare for the behavior of the electric bus 10, and it is thus possible for the passengers to avoid feeling unsteady or losing their balance when the electric bus 10 turns.

Further, although it has been described above that the notification sound generation unit 110 is composed of a computer having a CPU and a memory therein, this is not limiting, and it may be composed of an electric circuit other than a computer.

Next, a vehicle notification sound generation system 150 according to another embodiment will be described with reference to FIG. 5. The portions that are similar to those included in the vehicle notification sound generation system 100 described above with reference to FIG. 2 are assigned the same reference signs, and their repeated description will be omitted.

Figure 5:
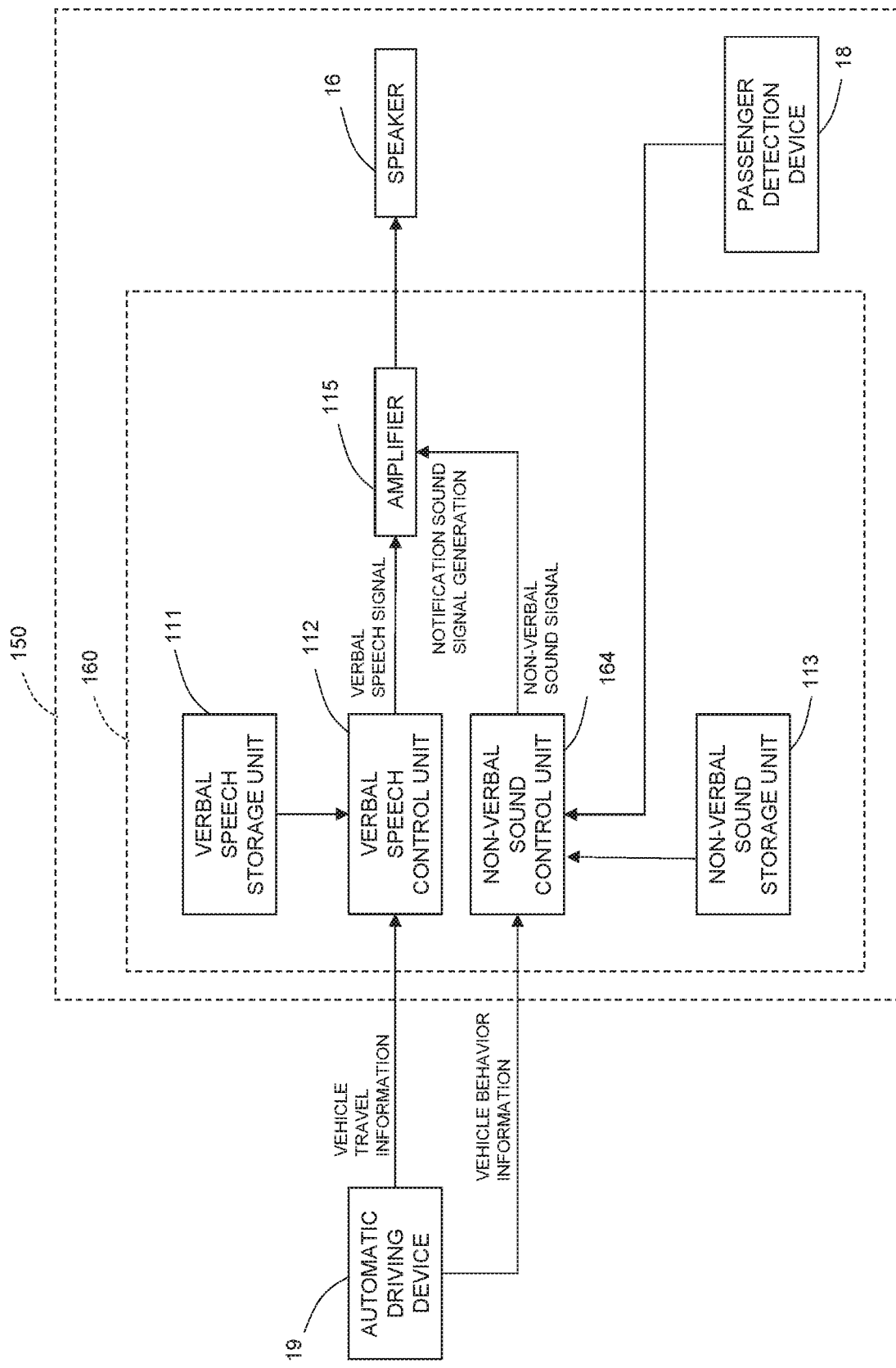
FIG. 5 is a functional block diagram of a vehicle notification sound generation system according to another embodiment.

As shown in FIG. 5, the vehicle notification sound generation system 150 is composed of a notification sound generation unit 160, the speaker 16, and the passenger detection device 18. As shown in FIG. 1, the passenger detection device 18 is located in the vehicle chamber 11 and detects the presence of a standing passenger or a wheelchair passenger in the vehicle chamber. The passenger detection device 18 may, for example, capture an image of the inside of the vehicle chamber by a camera installed in the vehicle chamber and detect a standing passenger or a wheelchair passenger in the vehicle chamber based on the captured image. The passenger detection device 18 may also detect a standing passenger or a wheelchair passenger by a load sensor located on the floor. An output from the passenger detection device 18 is input to a non-verbal sound control unit 164.

In addition to the functions of the non-verbal sound control unit 114 of the vehicle notification sound generation system 100 described above with reference to FIG. 2, the non-verbal sound control unit 164 prohibits output of a non-verbal sound signal or reduces the output gain of the non-verbal sound signal when the non-verbal sound control unit 164 receives, as an input, no signal indicating detection of a standing passenger or a wheelchair passenger in the vehicle chamber from the passenger detection device 18.

It is thus possible to prevent discomfort to the sitting passengers when there is no standing passenger or wheelchair passenger.

Next, a vehicle notification sound generation system 170 according to another embodiment will be described with reference to FIG. 6. The portions that are similar to those included in the vehicle notification sound generation system 100 described above with reference to FIG. 2 are assigned the same reference signs, and their repeated description will be omitted.

Figure 6:
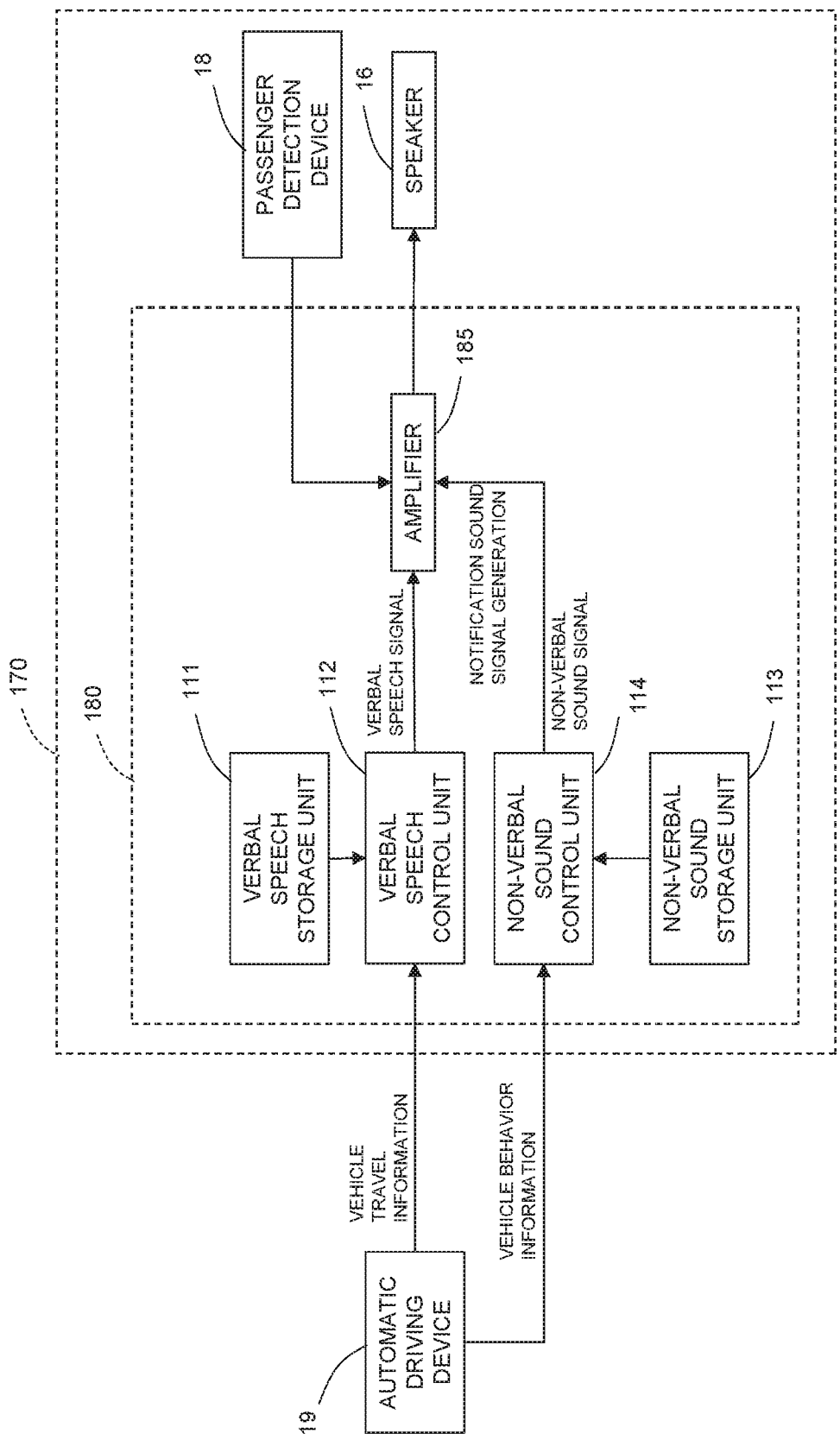
FIG. 6 is a functional block diagram of a vehicle notification sound generation system according to another embodiment.

As shown in FIG. 6, the vehicle notification sound generation system 170 is composed of a notification sound generation unit 180, the speaker 16, and the passenger detection device 18. An output from the passenger detection device 18 is input to an amplifier 185.

In addition to the functions of the amplifier 115 of the vehicle notification sound generation system 100 described above with reference to FIG. 2, the amplifier 185 prohibits synthesis of a non-verbal sound signal input from the non-verbal sound control unit 114, or reduces the gain of the non-verbal sound signal and synthesizes the resulting signal with a verbal speech signal, to thereby generate a notification sound signal when the amplifier 185 receives, as an input, no signal indicating detection of a standing passenger or a wheelchair passenger in the vehicle chamber from the passenger detection device 18.

Thus, similarly to the vehicle notification sound generation system 150, it is possible to prevent discomfort to the sitting passengers when there is no standing passenger or wheelchair passenger.

Figure 7:
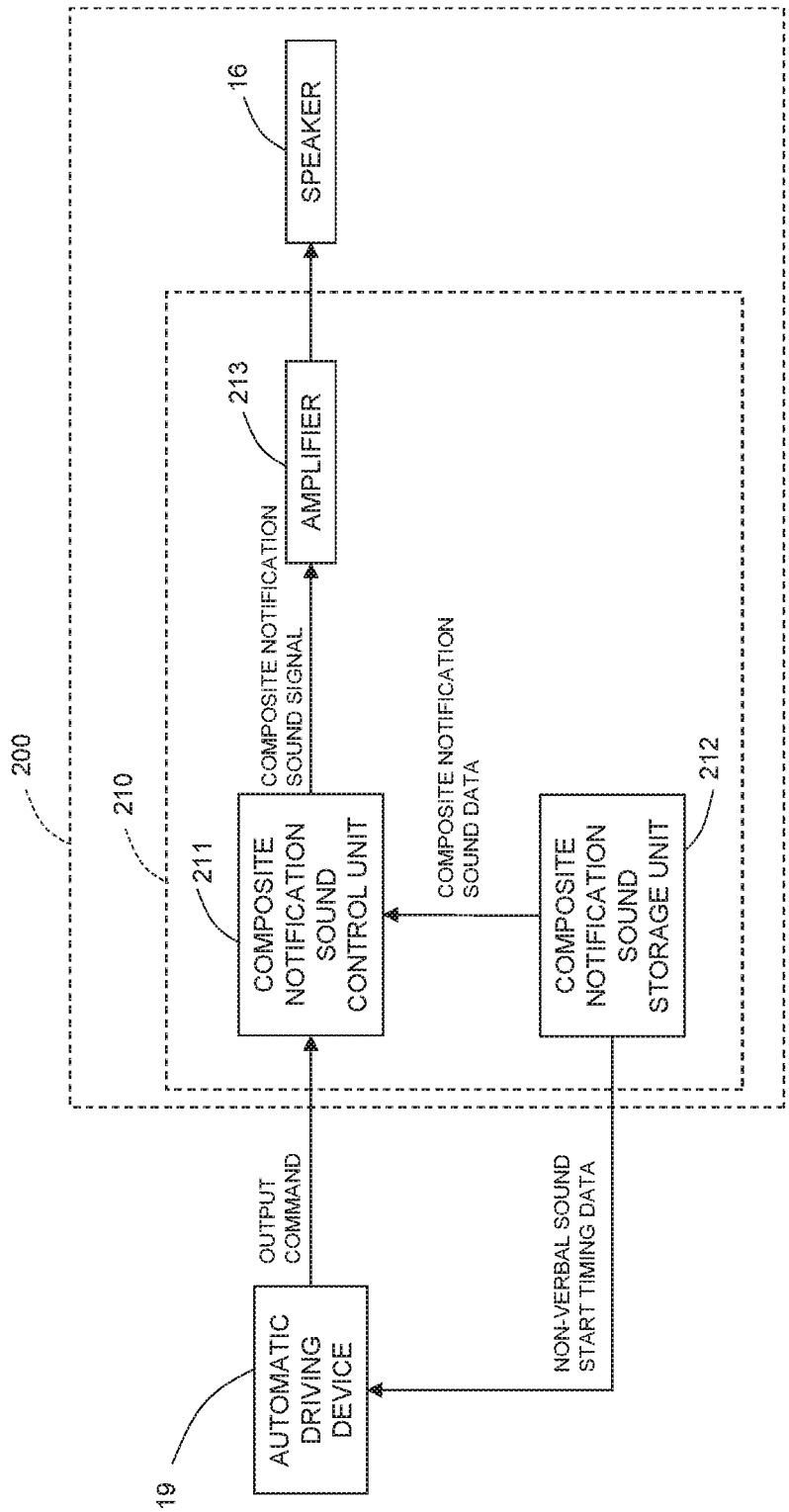
FIG. 7 is a functional block diagram of a vehicle notification sound generation system according to another embodiment.

Next, a vehicle notification sound generation system 200 according to another embodiment will be described with reference to FIGS. 7 to 9. As shown in FIG. 7, the vehicle notification sound generation system 200 is composed of a notification sound generation unit 210 and the speaker 16. The notification sound generation unit 210 is composed of a computer having a CPU and a memory therein and includes functional blocks of a composite notification sound control unit 211, a composite notification sound storage unit 212, and an amplifier 213.

Figure 8:
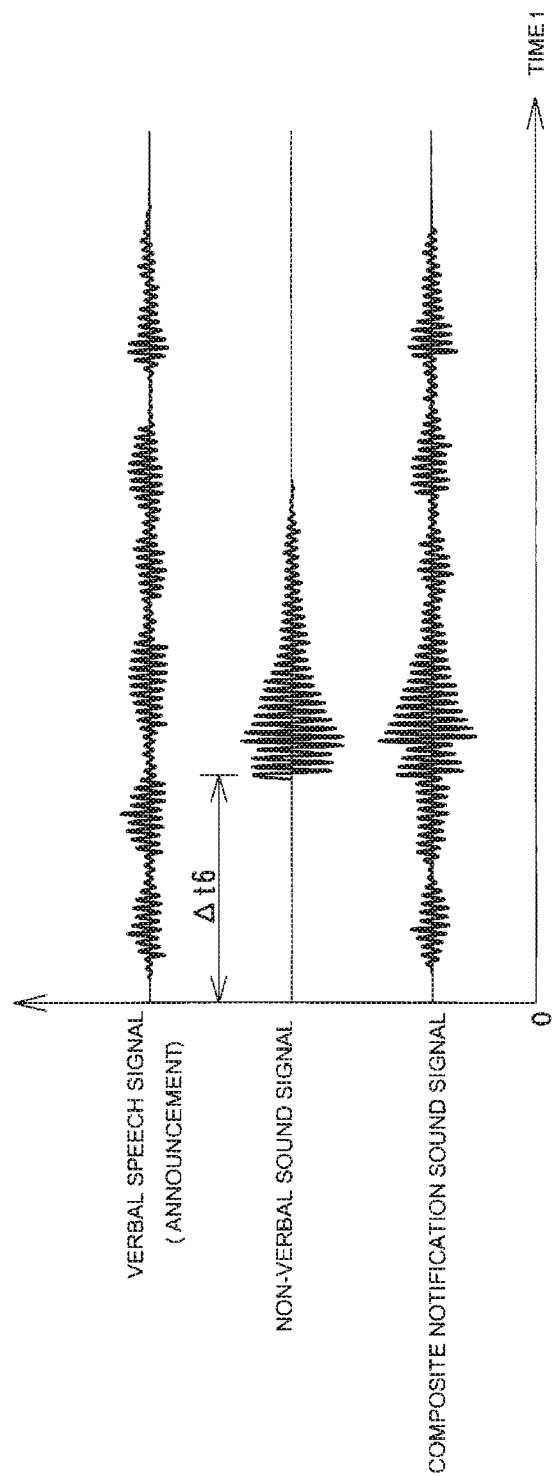
FIG. 8 is a diagram showing temporal changes of a composite notification sound signal of the vehicle notification sound generation system shown in FIG. 7.
Figure 9:
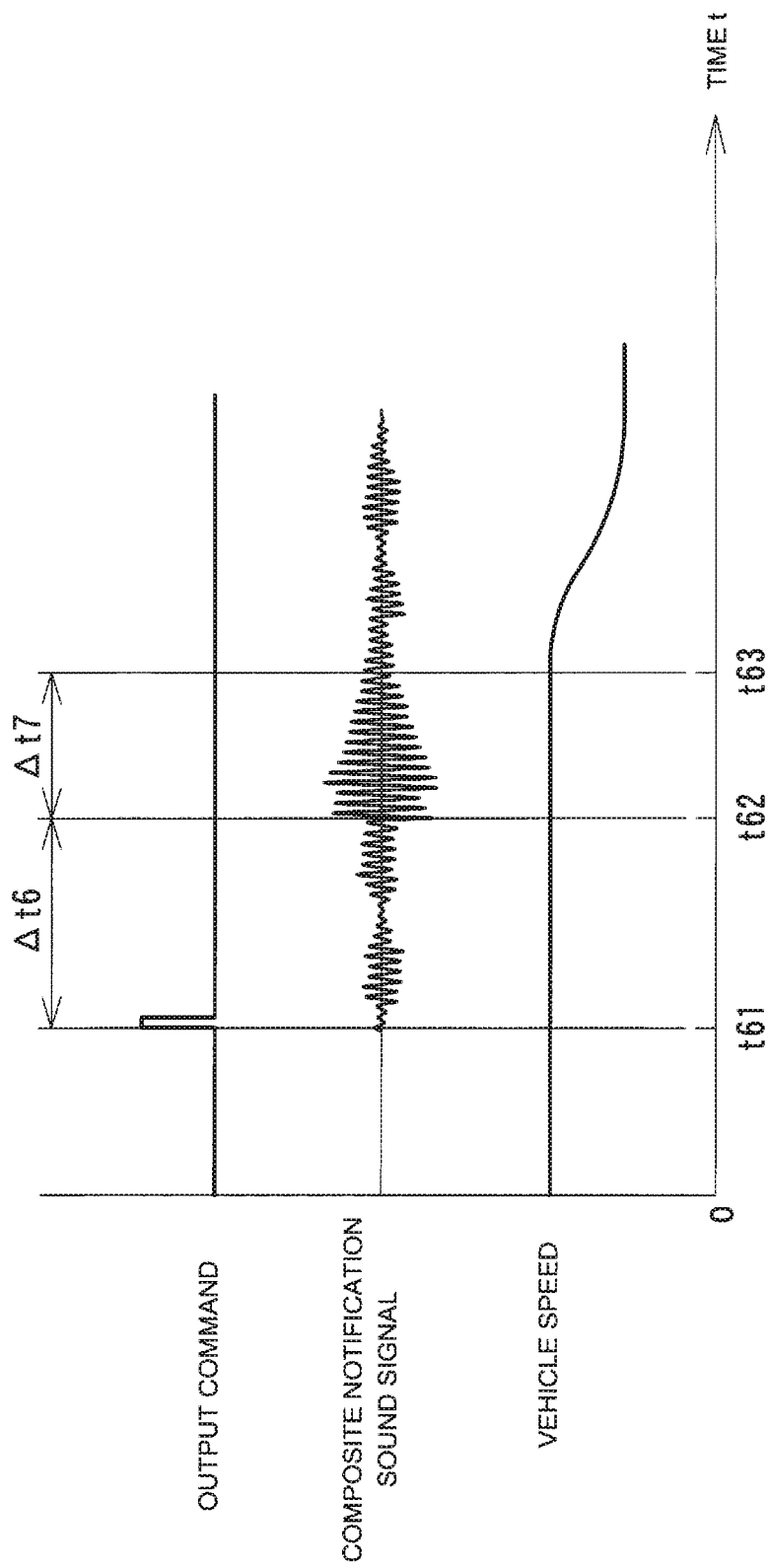
FIG. 9 is a graph showing changes in vehicle speed, the timing of a command signal to output a composite notification sound, and temporal changes of the output composite notification sound signal of the vehicle notification sound generation system shown in FIG. 7.

The composite notification sound storage unit 212 stores a composite notification sound signal in which a verbal speech signal of an announcement and a non-verbal sound signal are as shown in FIG. 8. The composite notification sound signal is obtained by synthesizing the verbal speech signal of one announcement and one non-verbal sound signal corresponding to the behavior of the electric bus 10 after that announcement. The composite notification sound signal may be obtained, for example, by overlapping a verbal speech signal of the announcement "the bus is now leaving" that is made immediately before the electric bus 10 departs, with the non-verbal sound signal "pip" that corresponds to acceleration after the departure of the bus as described with reference to FIG. 3C. The composite notification sound signal may also be obtained by overlapping a verbal speech signal of the announcement "the bus will be arriving at XX shortly" that is made before the electric bus 10 stops, with a non-verbal sound signal that fades out so as to correspond to deceleration of the electric bus 10 to stop as shown in FIGS. 4D to 4G.

Here, the non-verbal sound signal is started with a delay of time Δt6 from the start of the verbal speech signal. The composite notification sound storage unit 212 stores time Δt6 as start timing data for the non-verbal sound signal together with the composite notification sound signal.

The automatic driving device 19 outputs to the composite notification sound control unit 211, prior to the behavior of the electric bus 10 to be performed, a command to output a composite notification sound corresponding to that behavior. This will be specifically described by the examples described above. Before the departure of the electric bus 10, the automatic driving device 19 outputs, to the composite notification sound control unit 211, a command to output a composite notification sound in which a verbal speech signal of the announcement "the bus is now leaving" is overlapped with the non-verbal sound signal "pip" corresponding to acceleration after the departure of the bus. Similarly, before decelerating the electric bus 10, the automatic driving device 19 outputs, to the composite notification sound control unit 211, a command to output a composite notification sound in which a verbal speech signal of the announcement "the bus will be arriving at XX shortly" is overlapped with a non-verbal sound signal that fades out so as to correspond to deceleration of the electric bus 10 to stop.

At this time, the automatic driving device 19 obtains, from the composite notification sound storage unit 212, start timing data for the non-verbal sound signal of the composite notification sound signal to be output, and outputs the command to output the composite notification sound based on the obtained start timing data. For example, as shown in FIG. 9, the automatic driving device 19 outputs the command to output the composite notification sound at time t61 that is earlier than time t63 by (time Δt7+time Δt6), such that the non-verbal sound is generated at time t62 that is earlier than time t63 at which the electric bus 10 starts deceleration, by time Δt7. The automatic driving device 19 also performs a similar operation in acceleration.

Upon receipt of the command to output the composite notification sound as an input from the automatic driving device 19, the composite notification sound control unit 211 reads out data of the composite notification sound signal from the composite notification sound storage unit 212 and outputs the date to the amplifier 213. The amplifier 213 drives the speaker 16 according to the input composite notification sound signal and outputs the composite notification sound to the vehicle chamber 11.

The vehicle notification sound generation system 200 described above can store, in the composite notification sound storage unit 212, the composite notification sound signal generated in advance, and output the composite notification sound according to the command from the automatic driving device 19. Therefore, unlike the vehicle notification sound generation system 100, the verbal speech and the non-verbal sound can be output without synthesizing the verbal speech signal and the non-verbal sound signal. Thus, it is possible to guide the passengers appropriately with a simple structure.

In addition, in the vehicle notification sound generation system 200, the automatic driving device 19 outputs, to the composite notification sound control unit 211, a command to output the composite notification sound signal so as to output the non-verbal sound a predetermined time before the start of acceleration/deceleration based on the start timing data for the non-verbal sound signal. This enables the passengers to prepare for the force applied during the acceleration/deceleration operation. It is thus possible for the passengers to avoid feeling unsteady or losing their balance when the electric bus 10 accelerates or decelerates.

The composite notification sound signal may be a signal in which a verbal speech signal of the announcement "the bus is turning right" that is made immediately before the electric bus 10 turns is overlapped with the non-verbal sound signal "pip" or "bleep" that corresponds to turning operation. In this case, the automatic driving device 19 can enable the passengers to prepare for the force applied during turning operation. Accordingly, it is possible for the passengers to avoid feeling unsteady or losing their balance when the electric bus 10 turns.

Although it has been described above that, in the vehicle notification sound generation system 200, the amplifier 213 drives the speaker 16, the vehicle notification sound generation system 200 may have no amplifier 213, and the composite notification sound control unit 211 may directly drive the speaker 16. Further, although it has been described above that the notification sound generation unit 210 is composed of a computer having a CPU and a memory therein, this is not limiting, and it may be composed of an electric circuit other than a computer.

Figure 10:
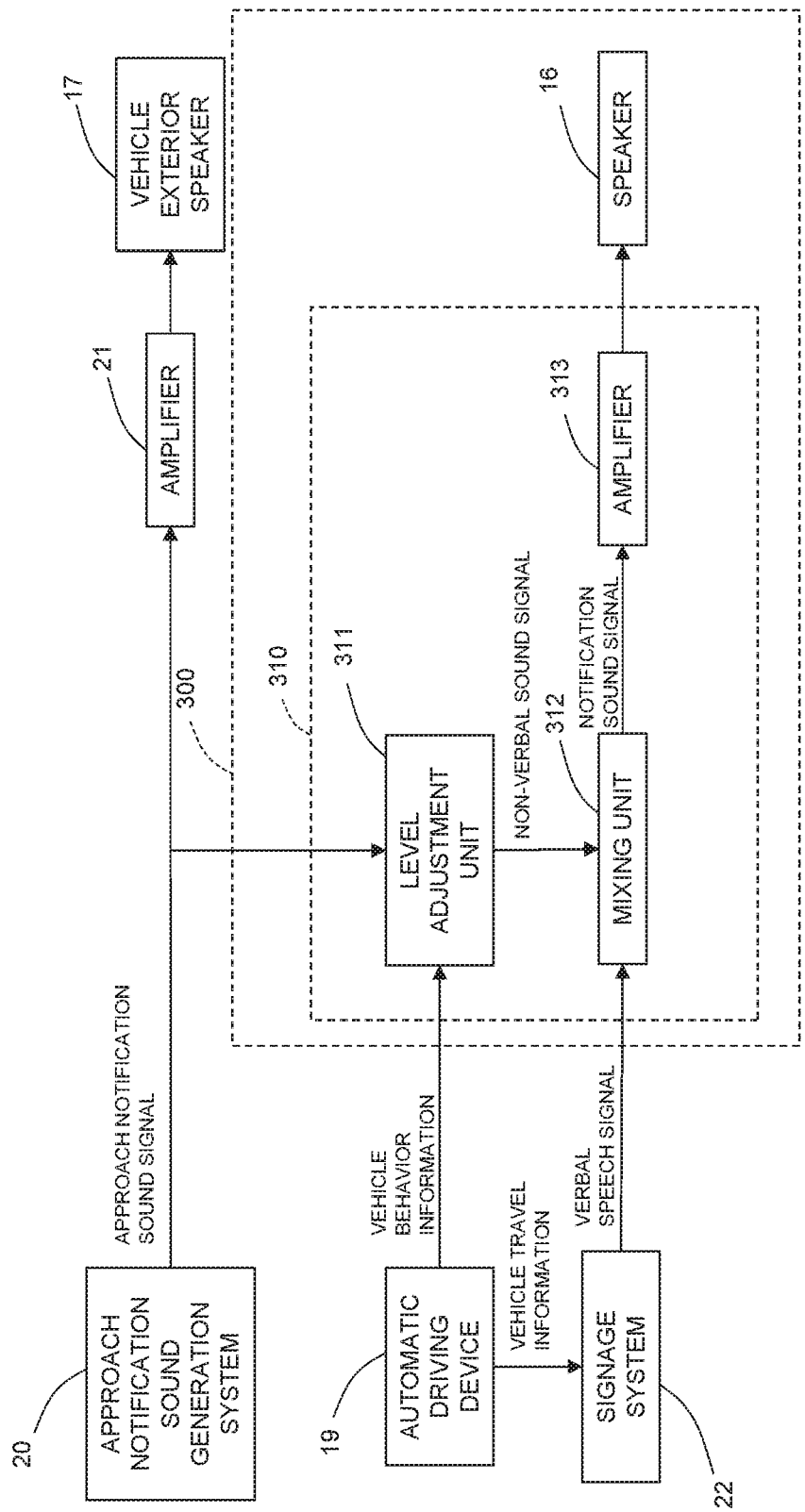
FIG. 10 is a functional block diagram of a vehicle notification sound generation system according to another embodiment.

Next, a vehicle notification sound generation system 300 according to another embodiment will be described with reference to FIG. 10. As shown in FIG. 10, the vehicle notification sound generation system 300 according to the present embodiment generates a notification sound signal by synthesizing a verbal speech signal input from the signage system 22 and an approach notification sound signal input from the approach notification sound generation system 20. Here, the signage system 22 causes the signage 15 provided in the vehicle chamber to display the destinations of the electric bus 10, etc.

The vehicle notification sound generation system 300 is composed of a notification sound generation unit 310 and the speaker 16. The notification sound generation unit 310 is composed of a computer having a CPU and a memory therein and includes functional blocks of a level adjustment unit 311, a mixing unit 312, and an amplifier 313.

The level adjustment unit 311 adjusts the gain of the approach notification sound signal output from the approach notification sound generation system 20 mounted on the electric bus 10, according to information about the state of acceleration/deceleration or information about the state of turning of the electric bus 10 input from the automatic driving device 19. While the electric bus 10 is running, the approach notification sound generation system 20 outputs, from an amplifier 21 and the vehicle exterior speaker 17 to the outside of the vehicle, an approach notification sound for notifying those in the vicinity that the electric bus 10 is approaching.

The level adjustment unit 311 changes the gain of the approach notification sound signal according to behavior information of the electric bus 10 input from the automatic driving device 19 in a manner similar to that of the volume of the non-verbal sound signal described with reference to FIG. 3B, and outputs the result to the mixing unit 312. For example, as shown in FIG. 3B, before time t11, the gain is set to 0 so as not to output any approach notification sound signal. The gain is gradually increased between time t11 and time T0. The gain is kept constant between time T0 and time t12 and is then gradually reduced between time t12 and time T1. As a result, as in FIG. 3B, a non-verbal sound signal having a trapezoidal shape is generated. This non-verbal sound signal is a non-verbal sound signal corresponding to the state of acceleration/deceleration of the electric bus 10, as described with reference to FIG. 3B. The level adjustment unit 311 then outputs the generated non-verbal sound signal to the mixing unit 312.

The mixing unit 312 generates a notification sound signal by synthesizing the verbal speech signal about the arrival at a destination input from the signage system 22 which generates the verbal speech signal based on travel information of the electric bus 10 input from the automatic driving device 19, and the non-verbal sound signal input from the level adjustment unit 311. The mixing unit 312 then outputs the generated notification sound signal to the amplifier 313. The amplifier 313 drives the speaker 16 based on the notification sound signal input from the mixing unit 312.

In addition to the effects of the vehicle notification sound generation system 100 described above with reference to FIG. 2, the vehicle notification sound generation system 300 described above generates the notification sound signal by synthesizing the approach notification sound signal output from the approach notification sound generation system 20 mounted on the electric bus 10 and the verbal speech signal output from the signage system 22. Therefore, there is no need for devices that generate a verbal speech signal and a non-verbal sound signal, and it is thus possible to guide the passengers appropriately with a simple structure.

Although it has been described above that, in the vehicle notification sound generation system 300, the amplifier 313 drives the speaker 16 based on the notification sound signal input from the mixing unit 312, this is not limiting. The mixing unit 312 may directly drive the speaker 16 without the amplifier 313. Although it has also been described that the notification sound generation unit 310 is composed of a computer having a CPU and a memory therein, this is not limiting, and it may be composed of an electric circuit other than a computer.

Figure 11:
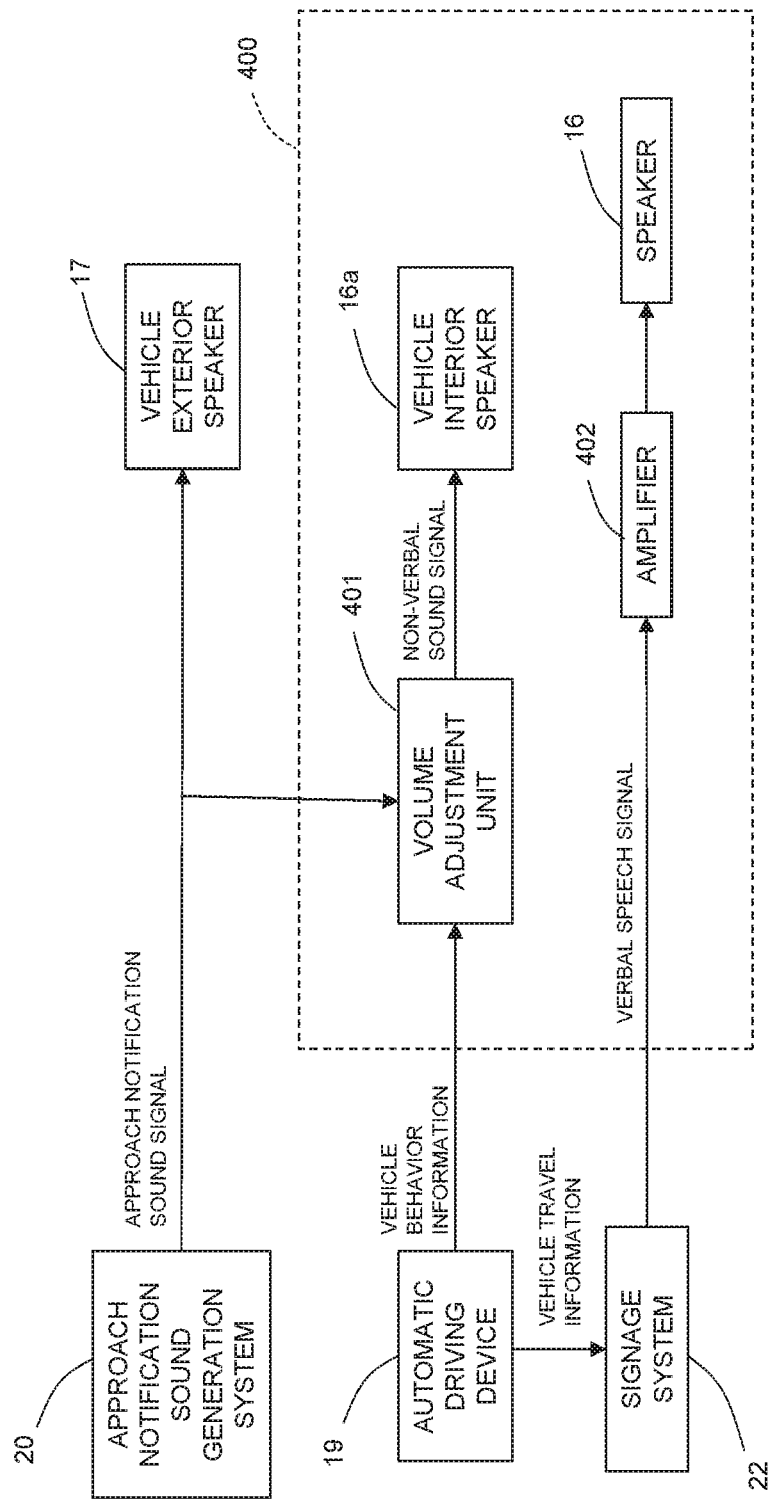
FIG. 11 is a functional block diagram of a vehicle notification sound generation system according to another embodiment.

Next, a vehicle notification sound generation system 400 according to another embodiment will be described with reference to FIG. 11. The portions that are similar to those included in the vehicle notification sound generation system 300 described above with reference to FIG. 10 are assigned the same reference signs, and their repeated description will be omitted. As shown in FIG. 11, the vehicle notification sound generation system 400 is composed of a volume adjustment unit 401, a vehicle interior speaker 16a which is a second speaker, an amplifier 402, and the speaker 16. The vehicle interior speaker 16a may be provided in the vicinity of the signage 15 or may be provided at other positions. The volume adjustment unit 401 is composed of a computer having a CPU and a memory therein. The volume adjustment unit 401 may be composed of an electric circuit other than a computer.

Like the level adjustment unit 311 described above with reference to FIG. 10, the volume adjustment unit 401 adjusts the gain of an approach notification sound signal output from the approach notification sound generation system 20 according to behavior information of the electric bus 10 input from the automatic driving device 19. The volume adjustment unit 401 then outputs the resulting signal as a non-verbal sound signal. This non-verbal sound signal is a non-verbal sound signal corresponding to the state of acceleration/deceleration or the state of turning of the electric bus 10. The volume adjustment unit 401 outputs the generated non-verbal sound signal to the vehicle interior speaker 16a to output a non-verbal sound from the vehicle interior speaker 16a.

In addition, the signage system 22 generates a verbal speech signal about the arrival at a destination based on travel information of the electric bus 10 input from the automatic driving device 19, and outputs the generated verbal speech signal to the amplifier 402. The amplifier 402 outputs an announcement into the verbal chamber 11 from the speaker 16 based on the verbal speech signal input from the signage system 22.

The vehicle notification sound generation system 400 described above generates the non-verbal sound signal by adjusting the gain of the approach notification sound signal output from the approach notification sound generation system 20 mounted on the electric bus 10. Therefore, there is no need for a device that generates a non-verbal sound signal, and it is thus possible to guide the passengers appropriately with a simple structure. Also, the verbal speech and the non-verbal sound are output from the different speakers without synthesizing the verbal speech signal and the non-verbal sound signal. Therefore, a simple structure can be achieved.

Next, a vehicle notification sound generation system 500 according to another embodiment will be described with reference to FIGS. 12 to 15. The portions that are similar to those included in the above description with reference to FIGS. 10 and 11 are assigned the same reference signs, and their repeated description will be omitted.

Figure 12:
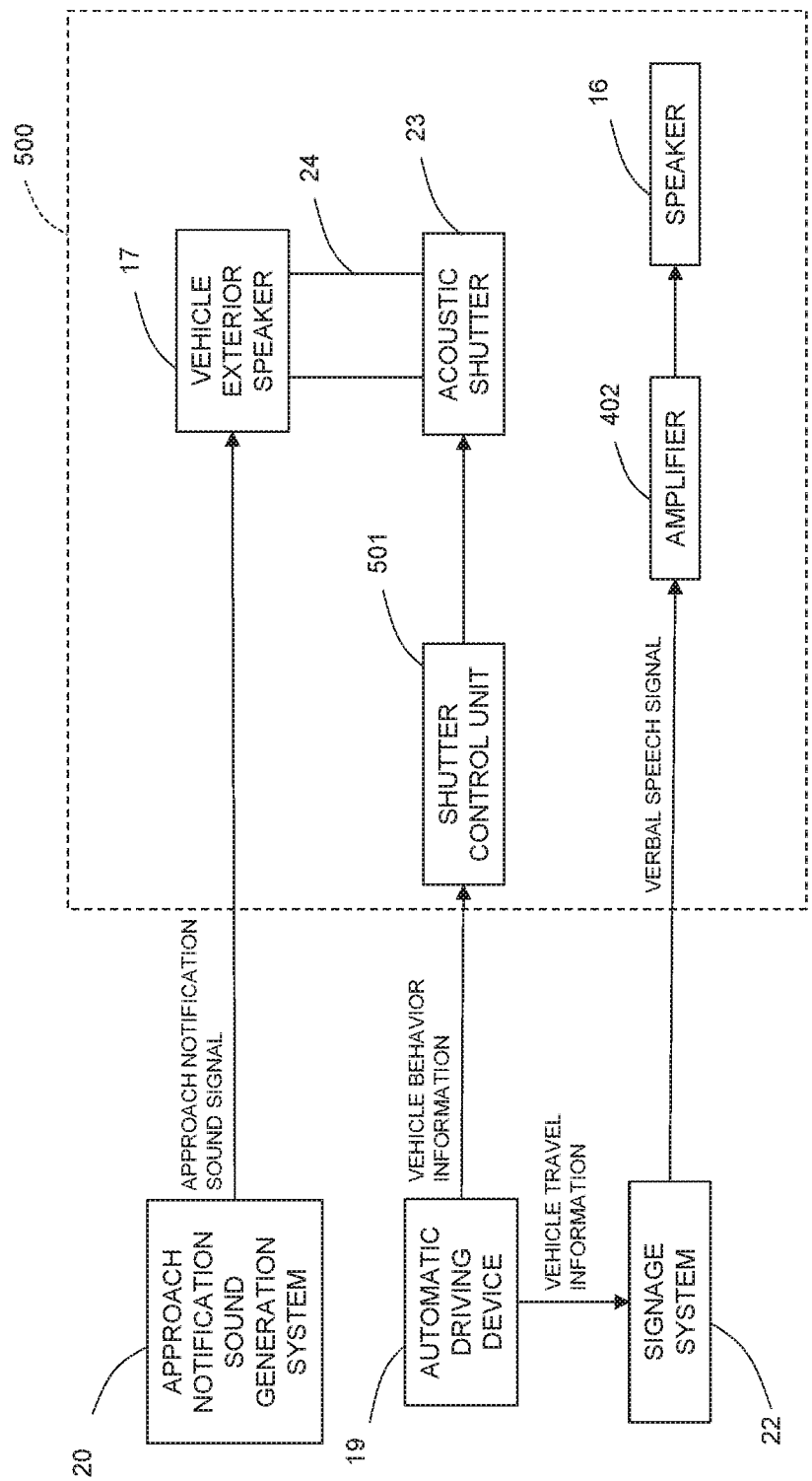
FIG. 12 is a functional block diagram of a vehicle notification sound generation system according to another embodiment.
Figure 13:
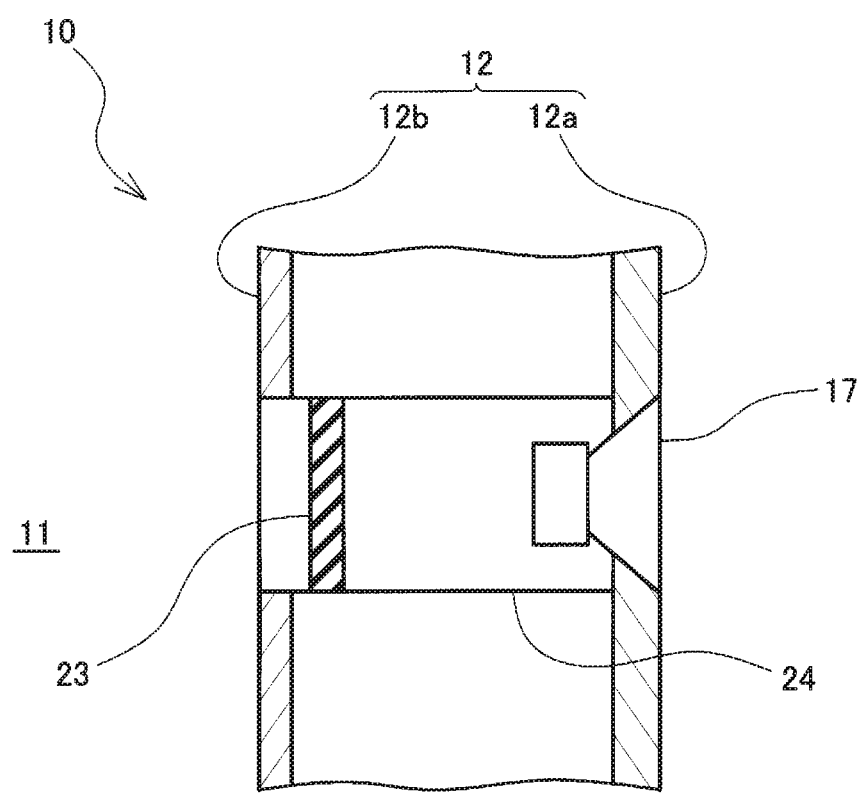
FIG. 13 is a cross-sectional view showing a structure of a vehicle exterior speaker used in the vehicle notification sound generation system shown in FIG. 12.

As shown in FIGS. 12 and 13, the vehicle notification sound generation system 500 includes the vehicle exterior speaker 17, a duct 24, an acoustic shutter 23, a shutter control unit 501, an amplifier 402, and the speaker 16. The shutter control unit 501 is composed of a computer having a CPU and a memory therein. The shutter control unit 501 may be composed of an electric circuit other than a computer.

The vehicle exterior speaker 17 outputs an approach notification sound to the outside of the vehicle based on an approach notification sound signal input from the approach notification sound generation system 20. The vehicle exterior speaker 17 constitutes a duct or third speaker. As shown in FIG. 13, the vehicle exterior speaker 17 is mounted in an outer panel 12a of the body 12. The duct 24 communicating with the vehicle chamber 11 through an inner panel 12b of the body 12 is provided on the back of the vehicle exterior speaker 17. The acoustic shutter 23 for opening and closing an opening of the duct 24 on the vehicle chamber side is attached on the vehicle chamber 11 side in the duct 24. When the acoustic shutter 23 is opened, sounds emitted from the back of the vehicle exterior speaker 17 are output to the vehicle chamber 11 through the duct 24.

The shutter control unit 501 adjusts the degree of opening of the acoustic shutter 23 according to behavior information of the electric bus 10 input from the automatic driving device 19. The amplifier 402 drives the speaker 16 based on a verbal speech signal input from the signage system 22. The speaker 16 constitutes a first speaker.

The shutter control unit 501 changes the degree of opening of the acoustic shutter 23 according to the behavior information of the electric bus 10, which is input from the automatic driving device 19, such that the volume of the non-verbal sound emitted to the vehicle chamber 11 changes like the volume in FIG. 3B. For example, before time t11 in FIG. 3B, the shutter control unit 501 sets the degree of opening of the acoustic shutter 23 to zero so as not to allow emission of any approach notification sound signal to the vehicle chamber 11. The shutter control unit 501 gradually increases the degree of opening of the acoustic shutter 23 between time t11 and time T0 and keeps the degree of opening of the acoustic shutter 23 constant between time T0 and time t12. The shutter control unit 501 then gradually reduces the degree of opening of the acoustic shutter 23 between time t12 and time T1. Accordingly, the volume of the non-verbal sound emitted to the vehicle chamber 11 is changed into a trapezoidal shape as in FIG. 3B.

As described above, the vehicle notification sound generation system 500 outputs the non-verbal sound by the vehicle exterior speaker 17, which outputs the approach notification sound signal. Therefore, it is possible to guide the passengers appropriately with a simple structure.

Figure 14:
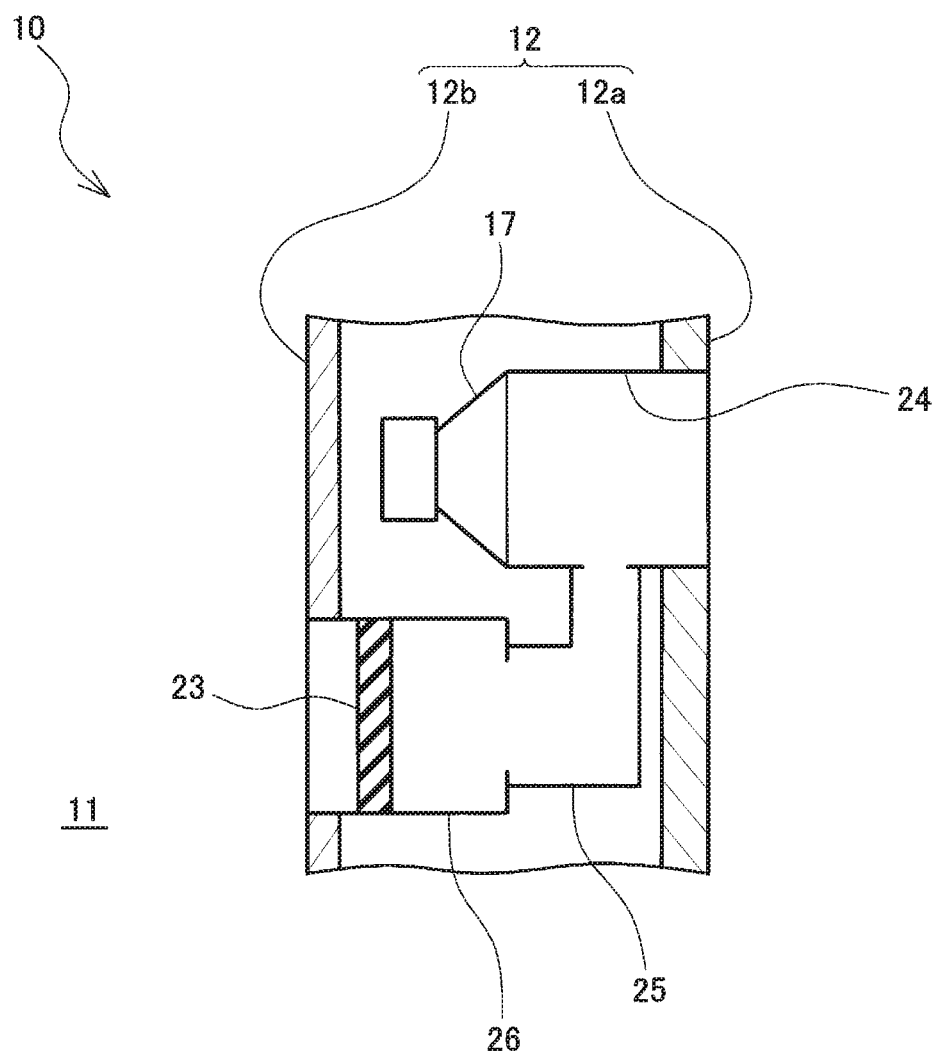
FIG. 14 is a cross-sectional view showing a structure of another vehicle exterior speaker used in the vehicle notification sound generation system shown in FIG. 12.
Figure 15:
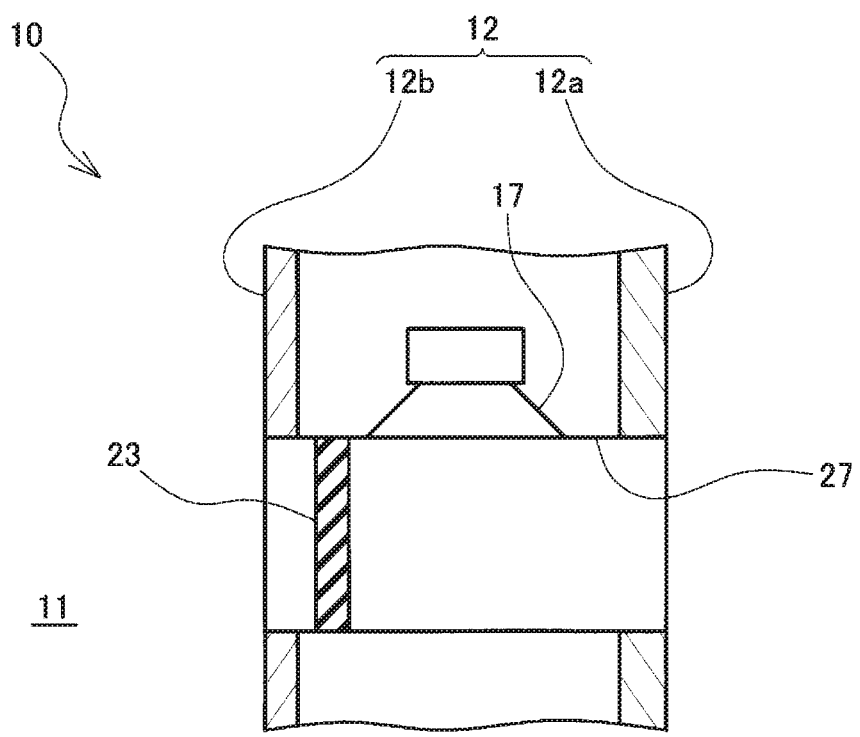
FIG. 15 is a cross-sectional view showing a structure of another vehicle exterior speaker used in the vehicle notification sound generation system shown in FIG. 12.

FIGS. 14 and 15 illustrates variants of the vehicle exterior speaker 17 and the duct 24 used in the vehicle notification sound generation system 500.

In the variant shown in FIG. 14, the vehicle exterior speaker 17 is connected to the inner panel side of the duct 24 which is mounted so as to penetrate through the outer panel 12a. The variant also includes a branching duct 25 between the vehicle exterior speaker 17 and the outer panel 12a, and a duct 26 connected between the branching duct 25 and the inner panel 12b, and the acoustic shutter 23 is mounted in the duct 26.

In the variant shown in FIG. 14, acoustic emission from the front of the vehicle exterior speaker 17 is guided to the vehicle chamber 11 through the branching duct 25 and the duct 26 and output from the vehicle chamber 11.

In the variant shown in FIG. 15, the vehicle exterior speaker 17 is mounted on the side surface of a through duct 27 mounted in the body 12. In the variant shown in FIG. 15, acoustic emission from the front of the vehicle exterior speaker 17 is guided to the vehicle chamber 11 through the through duct 27 and output from the vehicle chamber 11.

Each of the vehicle notification sound generation systems 100, 150, 170, 200, 300, 400, and 500 according to the embodiments described above outputs a verbal speech about the arrival at a destination and a non-verbal sound corresponding to the state of acceleration/deceleration of the vehicle from the speakers. The non-verbal sound is a different sound from the verbal sound in temporal change in frequency/volume, and therefore, even when the verbal speech and the non-verbal sound are output simultaneously, the passengers can distinguish and recognize the two sounds and can be guided appropriately.

The invention claimed is:

1. A vehicle notification sound generation system mounted on a self-driving capable bus-type vehicle, the system comprising a vehicle interior speaker, a central processing unit, an amplifier, and a camera, wherein:
   the vehicle interior speaker outputs a verbal speech, based on a verbal speech signal, about arrival of the vehicle at a destination and a non-verbal sound, based on a non-verbal sound signal, corresponding to a state of acceleration/deceleration or a state of turning of the vehicle before acceleration/deceleration operation, during acceleration/deceleration, before a start of turning, or during turning of the vehicle, the non-verbal sound is a sound that differs from the verbal speech in volume;
   the central processing unit is configured to:
      generate the verbal speech signal about the arrival of the vehicle at the destination based on travel information of the vehicle input from an automatic driving device of the vehicle; and
      generate the non-verbal sound signal corresponding to the state of acceleration/deceleration or the state of turning of the vehicle based on behavior information of the vehicle input from the automatic driving device of the vehicle; and
   the amplifier is configured to generate a notification sound signal by synthesizing the verbal speech signal and the non-verbal sound signal, and drive the vehicle interior speaker based on the generated notification sound signal;
   the camera, while operating, detects either an absence or a presence of a standing passenger or a wheelchair passenger in a vehicle chamber; and
   when the camera is operating and detects the absence of the standing passenger or the wheelchair passenger, the central processing unit prohibits output of the non-verbal sound signal.

2. The vehicle notification sound generation system according to claim 1, wherein
   the vehicle interior speaker is fixed on an internal wall of the vehicle on or adjacent to signage.

3. The vehicle notification sound generation system according to claim 1, wherein the central processing unit changes, a predetermined time before the end of acceleration or the end of turning, a waveform of the non-verbal sound signal obtained during acceleration.

4. The vehicle notification sound generation system according to claim 2, wherein the central processing unit changes, a predetermined time before the end of acceleration or the end of turning, a waveform of the non-verbal sound signal obtained during acceleration.

5. The vehicle notification sound generation system according to claim 1, further comprising:
   a memory that stores a composite notification sound signal that is obtained by synthesizing the verbal speech signal about the arrival of the vehicle at the destination and the non-verbal sound signal corresponding to a state of acceleration/deceleration or a state of turning of the vehicle according to the verbal speech signal; and
   wherein the central processing unit outputs the composite notification sound signal stored in the memory based on an output command from the automatic driving device of the vehicle.

6. The vehicle notification sound generation system according to claim 5, wherein
   the memory stores the composite notification sound signal and start timing data for the non-verbal sound signal included in the composite notification sound signal, and
   the automatic driving device of the vehicle obtains, from the memory, the start timing data for the non-verbal sound signal included in the composite notification sound signal, and outputs, based on the start timing data, a command to output the composite notification sound signal to the central processing unit.

7. The vehicle notification sound generation system according to claim 6, wherein
   the automatic driving device of the vehicle outputs, to the central processing unit, a command to output the composite notification sound signal such that the non-verbal sound signal is started a predetermined time before a start of acceleration/deceleration or a start of turning.

* * * * *